United States Patent
Masunaga et al.

(10) Patent No.: US 9,470,309 B2
(45) Date of Patent: Oct. 18, 2016

(54) VEHICLE TRANSMISSION CONTROLLER

(75) Inventors: Seiji Masunaga, Susono (JP); Yoshio Hasegawa, Chiryu (JP); Keisuke Ota, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/416,255

(22) PCT Filed: Jul. 31, 2012

(86) PCT No.: PCT/JP2012/069408
§ 371 (c)(1),
(2), (4) Date: Jan. 21, 2015

(87) PCT Pub. No.: WO2014/020685
PCT Pub. Date: Feb. 6, 2014

(65) Prior Publication Data
US 2015/0184740 A1    Jul. 2, 2015

(51) Int. Cl.
| | |
|---|---|
| *F16H 61/04* | (2006.01) |
| *F16H 59/42* | (2006.01) |
| *F16H 59/68* | (2006.01) |
| *F16H 63/50* | (2006.01) |
| *B60W 30/19* | (2012.01) |
| *F16H 61/02* | (2006.01) |
| *F16H 59/40* | (2006.01) |
| *F16H 61/06* | (2006.01) |
| *F16H 61/00* | (2006.01) |

(52) U.S. Cl.
CPC .......... *F16H 61/0213* (2013.01); *B60W 30/19* (2013.01); *F16H 59/40* (2013.01); *F16H 59/42* (2013.01); *F16H 59/68* (2013.01); *F16H 61/04* (2013.01); *F16H 61/061* (2013.01); *F16H 63/502* (2013.01); *F16H 2061/0093* (2013.01)

(58) Field of Classification Search
CPC ........................................................ F16H 61/04
See application file for complete search history.

(56) References Cited

U.S. PATENT DOCUMENTS

| | | | |
|---|---|---|---|
| 7,695,405 B2* | 4/2010 | Satou | B60W 30/19 477/107 |
| 8,219,293 B2* | 7/2012 | Sato | F16H 61/061 477/34 |
| 2008/0017467 A1 | 1/2008 | Honma et al. | |

FOREIGN PATENT DOCUMENTS

| | | |
|---|---|---|
| JP | 2000-097325 A | 4/2000 |
| JP | 2008-025637 A | 2/2008 |

* cited by examiner

*Primary Examiner* — Jacob S Scott
*Assistant Examiner* — Tinh Dang
(74) *Attorney, Agent, or Firm* — Oliff PLC

(57) ABSTRACT

The present invention executes a desired gear shift of an automatic transmission using gear shift modeling even when there are three control inputs to two target gear shift values. Setting torque share ratio as a constraint on the equation of motion for the automatic transmission is suitable for controlling the transfer of engaging unit torque, which is considered to be difficult in variable speed control, and allows solving of the equation of motion. Viewed from a different angle, because the torque share ratio, which represents the torque transfer, has been set as a constraint, any gear shift pattern can be handled with a single gear shift model.

8 Claims, 8 Drawing Sheets

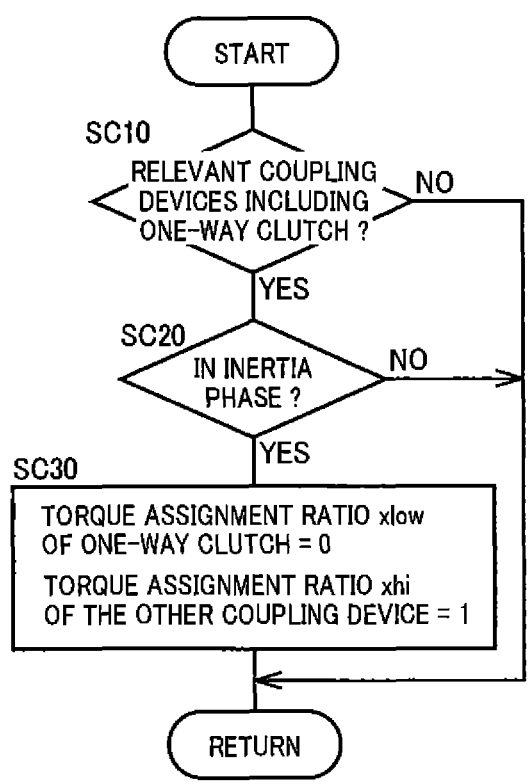

VEHICLE TRANSMISSION CONTROLLER

TECHNICAL FIELD

The present invention relates to a vehicle shift control apparatus configured to implement a shifting control of an automatic transmission, and more particularly to techniques for implementing the shifting control of the automatic transmission according to a shifting model.

BACKGROUND ART

There is well known an automatic transmission which has a plurality of coupling devices for transmitting a rotary motion and a torque between an input shaft provided to receive a chive force from a drive power source and an output shaft provided to transmit the drive force to drive wheels, and which is configured to be shifted with concurrently performed engaging and releasing actions of the respective coupling devices. Generally, the automatic transmission of this type is shifted according to manipulated amounts, i.e. control input determined by a control map obtained for each shift position by simulation with an actual vehicle wherein required values (namely, the manipulated amounts) of control parameters (such as torque values) of devices to be controlled for shifting actions are optimized for each shift position. However, a recent demand for an increase of the required number of shift positions of an automatic transmission causes a need for a considerably large amount of efforts for optimization of the manipulated amounts, making it difficult to adopt a shifting control mode based on the control map. In view of this difficulty, there has been proposed a shifting model control which is a shifting control mode based on motion equations for each of rotary elements incorporated in the automatic transmission. In this shifting model control, the automatic transmission is shifted according to manipulated amounts uniquely determined by solving the motion equations obtained on the basis of a required manner of change (shifting target values) for each shifting action. For instance, Patent Document 1 discloses a technique for implementing a shifting control of the automatic transmission wherein a target value of a rotating speed of an input shaft of the automatic transmission is determined as one of the shifting target values during an inertia phase control, while a required value of a torque of a clutch to be engaged is calculated as one of the manipulated amounts according to a shifting model. The Patent Document 1 further discloses a technique for implementing a shifting control of the automatic transmission wherein target values of the rotating speed of the input shaft and a torque of an output shaft of the automatic transmission are determined as the shifting target values, while a required value of a torque of a clutch to be engaged and a required value of a torque of a clutch to be released are calculated as the manipulated amounts according to a shifting model.

PRIOR ART DOCUMENT

Patent Document

Patent Document 1: JP-2000-97325

SUMMARY OF THE INVENTION

Object Achieved by the Invention

By the way, according to the techniques disclosed in the above-identified Patent Document 1, the shifting control is implemented by controlling one device for one shifting target value, or two devices for two shifting target values. However, these techniques disclosed in the Patent Document 1 may suffer from deterioration of drivability of the vehicle due to a relatively long time required for completion of a shifting action of the automatic transmission, because a hydraulic pressure of a coupling device to be released for the shifting action is first lowered for a releasing action of the coupling device, and is then temporarily raised for an engaging action of the coupling device, in order to offset an inertia torque in the inertia phase (in other words, in order to prevent a substantial change of the torque of the output shaft in the inertia phase). On the other hand, there is well known a technique so-called "engine torque reduction control" wherein a torque of an engine is temporarily reduced in the inertia phase in order to offset the inertia torque. According to the techniques disclosed in the above-identified Patent Document 1, however, the motion equations do not consider the engine as a controlled object. That is, according to the techniques disclosed in the Patent Document 1, the motion equations are solved with respect to a certain value of the engine torque, so that the shifting model control disclosed in the Patent Document 1 does not permit offsetting of the inertia torque by the engine torque reduction control implemented in place of the temporary rise of the hydraulic pressure of the coupling device to be released for the shifting action. Although the engine torque reduction control may be implemented in addition to the shifting model control, the engine torque reduction control disturbs the shifting model control as a whole, leading to a need for solving again the motion equations, and a consequent requirement for a considerably long time for completion of the shifting action, and a risk of deterioration of the vehicle drivability due to an increase of the shifting shock. If the engine torque is also determined uniquely as a manipulated amount according to the shifting model control, on the other hand, three manipulated amounts are used for two shifting target values, so that the motion equations cannot be solved, resulting in a failure of the shifting action of the automatic transmission according to the shifting model control. In this respect, it is noted that the problems indicated above are not publicly known, and that there have been no proposals to suitably set a restricting condition for solving the motion equations according to one shifting model for each of different shifting actions including a power-on shift-up action, a power-off shift-up action, a power-on shift-down action and a power-off shift-down action, where the three manipulated amounts are used for the two shifting target values.

The present invention was made in view of the background art described above. It is therefore an object of the present invention to provide a vehicle shift control apparatus which permits a desired shifting control of an automatic transmission according to a shifting model, even where three manipulated amounts are used for two shifting target values.

Means for Achieving the Object

The object indicated above is achieved according to a first aspect of the present invention, which provides a shift control apparatus for a vehicle including (a) an automatic transmission which comprises a plurality of coupling devices for transmitting a rotary motion and a torque between an input shaft provided to receive a drive force from a drive power source and an output shaft provided to transmit the drive force to drive wheels, and which is configured to be shifted with concurrently performed engaging and releasing actions of the respective coupling devices, the above-described control apparatus being configured to implement a shifting control of the above-described automatic transmission according to a predetermined shifting model for determining manipulated amounts to establish shifting target values, the control apparatus being characterized by: (b) setting, as the above-described shifting target values, two values of a torque of a rotary member disposed on the side of the above-described output shaft, and a rate of change of a rotating speed of a rotary member disposed on the side of the above-described input shaft; (c) setting, as the above-described manipulated amounts, three values of a torque of the rotary member disposed on the side of the above-described input shaft, a torque capacity of one of the coupling devices which is to be engaged for a shifting action of the above-described automatic transmission, and a torque capacity of the other of the coupling devices which is to be released for the shifting action; and (d) setting torque assignment ratios which are ratios of torques to be transferred through the respective coupling devices to be engaged and released for the shifting action, (e) whereby the shifting control of said automatic transmission is implemented according to the predetermined shifting model. The above-described torque assignment ratios are the ratios of the torques assigned to be transferred through the above-indicated coupling devices to be respectively engaged and released for the shifting action, when the assigned torques are represented by the torque of the rotary member on the side of the above-described input shaft.

Advantages of the Invention

According to the first aspect of the invention described above, the torque assignment ratios which are the ratios of the torques of the coupling devices to be respectively engaged and released are used as a restricting condition which should be satisfied to permit determination of the three manipulated amounts for establishing the two shifting target values. Accordingly, it is possible to adequately control a torque transfer between the coupling devices to be engaged and released (namely, a progress of the shifting action) during shifting, which would otherwise be considered difficult, and possible to determine the three manipulated amounts. Described in a different way, where one of the three manipulated amounts is set to be a predetermined certain value to determine the three manipulated amounts, this predetermined value should be selected from a large number of values corresponding to respective different shifting actions, for instance. According to the present invention, the torque assignment ratios representative of the torque transfer are set as the restricting condition, so that only one shifting model can deal with all of the different shifting actions. Described more specifically, if one of the torque capacity of the coupling device to be engaged and the torque capacity of the coupling device to be released is used as the restricting condition, there is a risk of occurrence of a tie-up phenomenon or a racing phenomenon of a rotary member. In the present invention, however, the torque assignment ratios suitable for controlling the progress of the shifting action are used as the restricting condition, so that it is possible to reduce a risk of occurrence of the tie-up or racing phenomenon, or to improve ease of control to be implemented for positively causing the tie-up or racing phenomenon to the contrary. If the torque of the rotary member disposed on the side of the input shaft is used as the restricting condition, there is a risk of failure to implement a control for temporarily changing the output torque of a drive power source. In the present invention, it is possible to adequately implement a torque reduction control for temporarily reducing the output torque of the drive power source in an inertia phase of the shifting action. Thus, the present invention permits adequate determination of the three manipulated amounts according to the shifting model, and a desired shifting control of the automatic transmission so as to establish the two shifting target values, although the three manipulated amounts are used for the two shifting target values.

According to a second aspect of the invention, the shift control apparatus according to the first aspect of the invention is configured such that the above-described shifting model is formulated to calculate the above-described manipulated amounts on the basis of the above-described shifting target values, and according to motion equations of the automatic transmission, and a relationship representative of the above-described torque assignment ratios, the motion equations including the above-described shifting target values and the above-described manipulated amounts. According to this second aspect of the invention, the three manipulated amounts can be adequately determined according to the above-indicated motion equations formulated to implement the control of the torque transfer during the shifting action, which would otherwise be considered difficult.

According to a third aspect of the invention, the shift control apparatus according to the first or second aspect of the invention is configured such that the torque capacity of each of selected at least one of the above-described coupling devices to be respectively engaged and released is determined on the basis of the torque assignment ratio which includes an added tie-up amount. If the manipulated amount in the form of the torque capacity of one of the coupling devices to be released and engaged is zero upon a considerable change of the shifting target value at a moment of initiation or termination of the inertia phase of the shifting action, there is a risk of increase of the shifting shock due to abrupt changes of the actual values of the torque of the rotary member on the side of the output shaft and the rate of change of the rotary member on the side of the input shaft, with respect to the target values, which abrupt changes are caused by delayed changes or variations of the actual values of the manipulated amounts in the form of the torque capacities of the coupling devices with respect to the required values. According to this third aspect of the invention, the torque transfer between the coupling devices is controlled so as to cause the tie-up phenomenon, whereby the torque transfer can be smoothly implemented, with each selected coupling device absorbing an abrupt change of the transmission output torque, making it possible to reduce the shifting shock which would have a risk of increase upon a considerable change of the shifting target values.

According to a fourth aspect of the invention, the shift control apparatus according to the third. aspect of the invention is configured such that the above-described each of selected at least one of the above-described coupling devices does not have a speed difference. According to this fourth aspect of the invention, the torque capacity of each selected coupling device increased to cause the tie-up phenomenon does not increase the transmission torque, that is, does not have an influence on the actual value of the torque of the rotary member on the side of the output shaft, in the phase other than the inertia phase.

According to a fifth aspect of the invention, the shift control apparatus according to the third or fourth aspect of the invention is configured such that the above-described tie-up amount is increased with a decrease of an amount of torque reduction by the drive power source in an inertia phase of the shifting action of the above-described automatic transmission, or with an increase of a delay in a response of the torque reduction. According to this fifth aspect of the invention, the torque transfer between each selected coupling device is controlled so as to increase the degree of causing the tie-up phenomenon with an increase of the amounts of change of the shifting target values, or with an increase of the degree of likelihood of abrupt change of the actual values of the shifting target values, making it possible to more effectively reduce the shifting shock.

According to a sixth aspect of the invention, the shift control apparatus according to any one of the third through fifth aspects of the invention is configured such that the shifting control of the above-described automatic transmission according to the above-described shifting model in an inertia phase is implemented by reversing a sign of the torque assignment ratio which is used to determine the torque capacity of the above-described each selected coupling device, the torque assignment ratio including the above-described added tie-up amount. According to this sixth aspect of the invention, which is based on a finding that there is a risk of failure to establish the shifting target values in the inertia phase where the torque assignment ratio includes the added tie-up amount, the sign of the torque assignment ratio of the relevant coupling device in the inertia phase is reversed such that the sign is coincident with the direction of the torque actually generated by the relevant coupling device, so that the manipulated amounts can be determined so as to permit the shifting target values to be established in the practical inertia phase, while permitting a smooth torque transfer between the coupling devices, whereby the shifting action can be performed in a desired manner.

BRIEF DESCRIPTION OF THE DRAWINGS

FIG. 8 is a flow chart for explaining a major control operation of the electronic control device, namely, a control operation to adequately shift the automatic transmission involving an engaging action or a releasing action of a one-way clutch.

MODE FOR CARRYING OUT THE INVENTION

Figure 1:
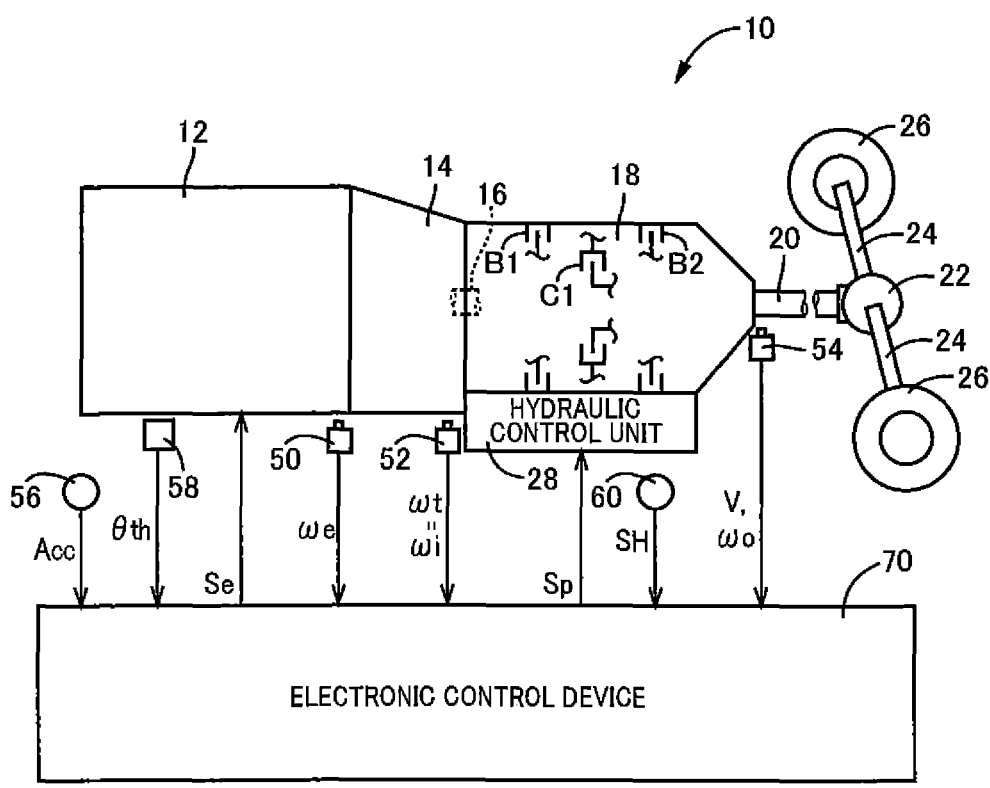
FIG. 1 is a schematic view for explaining an arrangement of a power transmitting path of a vehicle to which the present invention is applicable, and a major portion of a control system provided for the vehicle.

According to the present invention, the above-described vehicle is preferably arranged to transmit the drive force of the above-described drive power source to the above-described drive wheels through a power transmitting device such as the above-described automatic transmission. The automatic transmission is a step-variable automatic transmission having a plurality of shift positions (gear positions) having respective different speed ratios (gear ratios), each of which is selectively established with concurrently performed engaging and releasing actions of selected respective coupling devices. For example, the step-variable automatic transmission is a known planetary gear type automatic transmission. The coupling devices widely used in this planetary gear type automatic transmission include clutches and brakes of multiple-disk or single-disk type which are brought into their engaged states by hydraulic actuators, or other types of coupling devices such as band brakes. The above-described vehicle is provided with a hydraulic control unit configured to apply hydraulic pressures to the hydraulic actuators of the coupling devices, for instance. This hydraulic control unit incorporates linear solenoid valves, ON-OFF solenoid valves, etc., and applies output hydraulic pressures of those solenoid valves to the hydraulic actuators, either directly or indirectly via shift control valves, for example. The expression "apply hydraulic pressures to xxx" is interpreted to mean "cause the hydraulic pressures to act on xxx" or "supply a working oil pressurized to a certain hydraulic pressures, to xxx".

The above-described drive power source is preferably an engine such as a gasoline engine or a diesel engine. Alternatively, the drive power source is a prime mover including an electric motor or motors, or a combination of the prime mover and an engine.

Referring to the drawings, preferred embodiments of the present invention will be described in detail.

First Embodiment

FIG. 1 is the schematic view for explaining an arrangement of a power transmitting path from an engine 12 to drive wheels 26 of a vehicle 10 to which the present invention is applicable, and a major portion of a control system provided for the vehicle 10. As shown in FIG. 1, a drive force generated by the engine 12 serving as a drive power source is input to an automatic transmission 18 through a torque converter 14 and an input shaft 16, and is transmitted from an output shaft 20 of the automatic transmission 18 to the right and left drive wheels 26 through a differential gear device (differential gear) 22 and a pair of axles (drive shafts) 24 in this order of description.

The automatic transmission 18 is a known planetary gear type automatic transmission having one planetary gear set or a plurality of planetary gear sets, and a plurality of coupling devices (coupling elements), which are housed in a stationary member in the form of a transmission casing attached to a body of the vehicle. The automatic transmission 18 has a plurality of gear positions which are selectively established by the coupling devices. For instance, the automatic transmission 18 is a step-variable transmission which is shifted with so-called "clutch-to-clutch shifting actions", that is, with switching actions of the plurality of coupling devices (namely, with concurrently performed engaging and releasing actions of respective coupling devices). Each of the plurality of coupling devices is a hydraulically operated frictional coupling device configured to transmit a rotary motion and a torque between the input shaft 16 provided to receive the drive force from the engine 12 and the output shaft 20 provided to transmit the drive force to the drive wheels 26. This input shaft 16, which is an input shaft of the automatic transmission 18, also serves as a turbine shaft to be rotated by a turbine impeller of the torque converter 14.

Each of the hydraulically operated frictional coupling devices is a clutch or a brake which is controlled by a hydraulic control unit 28, so as to be selectively placed in its engaged state or released state. A torque capacity, namely, an engaging force of the clutch or brake is controlled by hydraulic pressure regulation by solenoid valves incorporated within the hydraulic control unit 28, so that two rotary members between which the clutch or brake is disposed are selectively coupled to each other. In this respect, it is noted that the torque capacity of the coupling device (hereinafter referred to as "clutch torque") is determined by a friction coefficient of friction members of the coupling device, and an engaging hydraulic pressure applied to the friction members to force the friction members against each other. To permit transmission of a torque (for instance, a transmission input torque Ti or turbine torque Tt received by the input shaft 16) between the input shaft 16 and the output shaft 20, without a slipping action of the coupling device (that is, without a speed difference between the two rotary members), the torque capacity of the coupling device is required to be larger than a transmission torque assigned to the coupling device to transmit the above-indicated torque (namely, larger than an assignment torque of the coupling device). It is noted that the transmission torque will not be increased by increasing the torque capacity after the torque capacity reaches the transmission torque. It is noted that for convenience's sake, the clutch torque and the engaging hydraulic pressure may be regarded as equivalent meaning in the present embodiment.

For example, the gear positions of the automatic transmission 18 include a low-speed gear position (low-gear position: first-speed gear position, for instance) to be established when a clutch C1 and a brake B1 are placed in their engaged states, and a high-speed gear position (high-gear position; second-speed gear position, for instance) to be established when the clutch C1 and a brake B2 are placed in their engaged states. Accordingly, the automatic transmission 18 is shifted between the low-gear position and the high-gear position, with switching actions of the brakes B1 and B2. In the following description of the present embodiment, the coupling device (brake B1, for example) placed in the engaged state to establish the low-gear position will be referred to as "low-gear position coupling device", while the coupling device (brake B2, for example) placed in the engaged state to establish the high-gear position will be referred to as "high-gear position coupling device". The low-gear position coupling device is brought into its released state when the automatic transmission 18 is shifted up from the low-gear position to the high-gear position, and is brought into its engaged state when the automatic transmission 18 is shifted down from the high-gear position to the low-gear position. On the other hand, the high-gear position coupling device is brought into its engaged state when the automatic transmission 18 is shifted up, and is brought into its released state when the automatic transmission 18 is shifted down.

Referring back to FIG. 1, the vehicle 10 is provided with an electronic control device 70 including a shift control apparatus configured to implement a shifting control of the automatic transmission 18, for instance. The electronic control device 70 incorporates a so-called microcomputer which comprises a CPU, a RAM, a ROM and an input-output interface and the CPU is operable to perform signal processing operations according to programs stored in the ROM while utilizing a temporary data storage function of the RAM, to implement various controls of the vehicle 10. For example the electronic control device 70 implements an output control of the engine 12 and a shifting control of the automatic transmission 18. The electronic control device 70 may be constituted by mutually independent control units as needed for respective controls such as the engine control and a hydraulic control (shifting control). Further, the electronic control device 70 is configured to receive various signals (such as: a signal indicative of an engine speed $\omega e$ which is an operating speed of the engine 12; a signal indicative of a turbine speed $\omega t$, namely, a transmission input speed $\omega i$, which is a rotating speed of the input shaft 16; a signal indicative of a transmission output speed $\omega o$ which is a rotating speed of the output shaft 20 corresponding to a vehicle running speed V; a signal indicative of an operation amount Acc of an accelerator pedal, which represents a drive force (drive torque) of the vehicle 10 corresponding to a vehicle output required by the vehicle operator; a signal indicative of an opening angle $\theta th$ of a throttle valve; and a signal indicative of a shift position SH selected by a shift lever or a paddle switch), from various sensors (such as: speed sensors 50, 52 and 54; an accelerator pedal operation amount sensor 56; a throttle valve opening angle sensor 58; and a shift position sensor 60). The electronic control device 70 is also configured to generate various signals such as engine output control command signals Se for controlling the output of the engine 12, and hydraulic command signals Sp controlling the hydraulic control unit 28 for actuating the hydraulic actuators of the automatic transmission 18.

Figure 2:
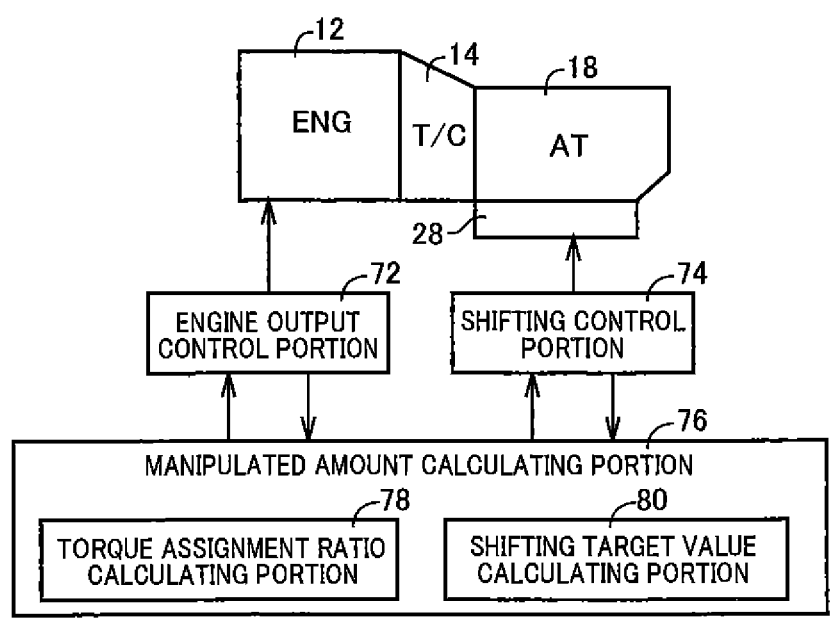
FIG. 2 is a functional block diagram for explaining major control functions of an electronic control device.

FIG. 2 is the functional block diagram for explaining major control functions of the electronic control device 70. The engine output control means in the form of an engine output control portion 72 shown in FIG. 2 is configured to generate the engine output control command signals Se for implementing a throttle control by operating a throttle actuator to control the electronic throttle valve so as to generate a required engine torque Te (hereinafter referred to as "required engine torque Tedem), a fuel injection amount control by operating a fuel injecting device to control an amount of injection of a fuel, and an ignition timing control by operating an igniter or an ignition device. The engine output control portion 72 calculates a required drive force Fdem on the basis of actual values of the accelerator pedal operation amount Acc and the vehicle running speed V, and according to a stored relationship (drive force map) not shown, among the vehicle running speed V and the required drive force Fdem, with the accelerator pedal operation amount Acc used as a parameter, for instance. The engine output control portion 72 calculates the required engine torque Tedem for obtaining the calculated required drive force Fdem, on the basis of an effective radius of tires of the drive wheels 26, the gear ratio of the presently established gear position of the automatic transmission 18, a final speed reduction ratio in a power transmitting path between the output shaft 20 and the drive wheels 26, and a torque ratio t of the torque converter 14. It is noted that the torque ratio t of the torque converter 14 is calculated on the basis of an actual value of a speed ratio e (=turbine speed $\omega t$/pump speed ωp (engine speed ωe) and according to a stored known relationship (operational characteristic map of the torque converter 14) among the speed ratio e, the torque ratio t, an operating efficiency and capacity coefficient of the torque converter 14.

The shifting control means in the form of a shifting control portion 74 is configured to implement the shifting control of the automatic transmission 18. Described more specifically, the shifting control portion 74 determines whether a shifting action of the automatic transmission 18 should take place. This determination is made on the basis of a running state of the vehicle represented by the actual values of the vehicle running speed V and the accelerator pedal operation amount Acc, and according to a stored known relationship (shifting map or shifting line diagram) using the vehicle running speed V and the accelerator pedal operation amount Acc as variables. When the shifting control portion 74 determines that a shifting action of the automatic transmission 18 should take place, the shifting control portion 74 implements an automatic shifting control so as to establish the newly selected gear position. For example, the shifting control portion 74 applies to the hydraulic control unit 28 the hydraulic command signals Sp for engaging and releasing the relevant coupling devices to shift the automatic transmission 18 to the newly selected gear position. For example, the hydraulic command signals Sp represent the commanded hydraulic pressure value for establishing the torque capacity of the low-gear position coupling device (hereinafter referred to as "low-gear position clutch torque"), and the commanded hydraulic pressure value for establishing the torque capacity of the high-gear position coupling device (hereinafter referred to as "high-gear position clutch torque").

The shifting control to shift the automatic transmission 18 may be formulated to determine the torque capacities (commanded hydraulic pressure values) during a shifting action according to a predetermined control map which is obtained by simulation with an actual vehicle wherein the shifting action of the automatic transmission 18 is performed so as to optimize the shifting shock and the required shifting time. This manner of shifting control requires different control maps respectively corresponding to the power-on shift-up action, power-off shift-up action, power-on shift-down action and power-off shift-down action, and corresponding to the respective combinations of the two gear positions between which the shifting action takes place. Therefore, a large amount of efforts is required for the above-indicated optimization, where the number of the gear positions of the automatic transmission 18 is relatively large.

In view of the finding described above, the shifting control according to the present embodiment employs a shifting model in place of the above-indicated control maps, to determine manipulated amounts for establishing shifting target values to shift up or down the automatic transmission 18. The above-indicated shifting target values are target values of control parameters (such as a shifting time and a drive force) determining a required manner of change during the relevant shifting action, while the above-indicated manipulated amounts are required values of control parameters (such as the engine torque and the clutch torques) of the devices to be controlled.

The shifting control of the automatic transmission 18 according to the shifting model will be described in detail. Equations (1) and (2) given below are motion equations applicable to a shifting action of the automatic transmission 18. These equations (1) and (2) are derived from motion equations for each of rotary elements of the automatic transmission 18 connected to each other, and relationship equations for the planetary gear set of the automatic transmission 18. The above-indicated motion equations for each rotary element are formulated such that a torque represented by a product of an inertia of each rotary element and a rate of change of a rotating speed of the rotary element is defined by torques of the three members (sun gear, carrier and ring gear) of the planetary gear set and one of two members disposed on the respective opposite sides of the coupling device, which one member is associated with each rotary element. The relationship equations for the planetary gear set, which use the gear ratio of the planetary gear set (=number of teeth of the sun gear/number of teeth of the ring gear), respectively represent a relationship of the torques of the three members of the planetary gear set and a relationship of the rates of change of the rotating speeds of the three members. In the equations (1) and (2), dωt/dt represents a time derivative of the turbine speed ωt (namely, transmission input speed ωi), that is, a rate of change of the turbine speed ωt, and therefore represents an angular acceleration of the input shaft 16 (hereinafter referred to as "input shaft angular acceleration), which is a rate of change of the rotating speed of the rotary member disposed on the side of the input shaft 16. (In the drawings and the equations, the rate of change is represented by a dot. This applies to the other values described below) dωo/dt represents a rate of change of the transmission output speed ωo) and an output shaft angular acceleration. Tt represents a torque of the input shaft 16, namely, a turbine torque, that is, the transmission input torque Ti, which is a torque of the rotary member disposed on the side of the input shaft 16. This turbine torque Tt is equivalent to the engine torque Te (=Tt/t) with the torque ratio t taken into account. To represents a torque of the output shaft 20, namely, the transmission output torque, which is a torque of the rotary member disposed on the side of the output shaft 20. Tclow represents the low-gear position clutch torque, which is the torque of the clutch to be released during a shift-up action, and the torque of the clutch to be engaged during a shift-down action. Tchi represents the high-gear position clutch torque, which is the torque of the clutch to be engaged during the shift-up action, and the torque of the clutch to be released during the shift-down action. a1, a2, b1, b2, c1, c2, d1 and d2 are constants used in the equations (1) and (2), which are coefficients determined on the basis of the inertia of each of the above-indicated rotary elements and the gear ratio of the above-described planetary gear set (these coefficients differ depending upon the specific shifting actions).

Equation 1

$$\dot{\omega}t = a1 \cdot Tt + b1 \cdot Tclow + c1 \cdot Tchi + d1 \cdot \dot{\omega}o \quad (1)$$

$$To = a2 \cdot Tt + b2 \cdot Tclow + c2 \cdot Tchi + d2 \cdot \dot{\omega}o \quad (2)$$

The above-indicated equations (1) and (2) are gear train motion equations of the automatic transmission 18 obtained by formulating a relationship between the shifting target values and the manipulated amounts. The shifting target values are target values of the shifting time and the drive force, and can be dealt with by the gear train motion equations. In the present embodiment, the shifting time is represented by the input shaft angular acceleration dωt/dt, as an example. Further, the drive force is represented by the transmission output torque To, as an example. That is, the input shaft angular acceleration dωt/dt and the transmission output torque To are used as the two shifting target values, in the present embodiment. On the other hand, the turbine torque Tt (equivalent to the engine torque Te), the low-gear position clutch torque Tclow and the high-gear position clutch torque Tchi are used as the three manipulated amounts to establish the shifting target values, in the present embodiment. Therefore, the three manipulated amounts to establish the two shifting target values represented by the two motion equations in the form of the above-indicated equations (1) and (2) cannot be obtained uniquely by solving the two equations. Thus, the automatic transmission 18 cannot be adequately shifted so as to establish the two shifting target values, according to the shifting model. It is noted that the output shaft angular acceleration dωo/dt is calculated from the transmission output speed ωo detected by the speed sensor 54.

By the way, it is considered possible to uniquely obtain the manipulated amounts by using a certain restricting condition in addition to the above-indicated equations (1) and (2). In the shifting control of the automatic transmission 18, it is considered difficult to control a torque transfer between the two coupling devices to be concurrently released and engaged (namely, to control a progress of the shifting action). On the other hand, where any one of the three manipulated amounts is set to be a certain value for determining the three manipulated amounts, there are available a large number of methods to set this manipulated amount. For instance, one of the three manipulated amounts is set to be a certain value depending upon the specific shifting action. If a restricting condition is set for only one of the torques of the clutches to be released and engaged, regarding this certain value of the manipulated amount, there is a risk of easy occurrence of a tie-up or racing phenomenon during the shifting action, or a risk of deterioration of ease of control to be implemented to positively cause the tie-up or racing phenomenon during the shifting action. If a restricting condition is set for a manner of change of the engine torque, on the other hand, there is a possibility of failure to implement the engine torque reduction control so as to temporarily change the engine torque in the inertia phase. In view of these possibilities, the present embodiment is configured to set, as the above-indicated restricting condition, torque assignment ratios, which are ratios of the torques to be transferred through the respective two coupling devices to be engaged and released, and which suitably represent and permit controlling the torque transfer between the two coupling devices during each shifting action and which can deal with all of the shifting actions. Namely, the inventors found it effective to set, as the above-indicated restricting condition, the torque assignment ratios which permit the torque transfer during the shifting action to be incorporated into the motion equations and which permit uniquely obtaining the manipulated amounts. The torque assignment ratios are the ratios of the torques assigned to be transferred through the respective two coupling devices, with respect to a sum (total transmission torque) of the torques assigned to be transferred through the respective two coupling devices during the relevant shifting action of the automatic transmission 18, when the sum is represented by the torque of the input shaft 16 (total input shaft transmission torque), for instance. In the present embodiment, the torque assignment ratio of the low-gear position coupling device is represented by xlow, while the torque assignment ratio of the high-gear position coupling device is represented by xhi. These torque assignment ratios xlow and xhi are defined by the following equations (3) and (4), which include a torque assignment ratio x (0≤x≤1, for example) which changes with the time so as to reflect a transfer of the torque during the shifting action:

$$xlow = x \tag{3}$$

$$xhi = 1-x \tag{4}$$

An equation representing a relationship between the low-gear position clutch torque Tclow and the high-gear position clutch torque Tchi can be defined by the torque assignment ratios x (=xlow) and (1−x) (=xhi) and on the basis of converted values of Tclow and Tchi into the torques of the input shaft 16 and the above-indicated equations (3) and (4). Relationship equations for calculating the manipulated amounts in the form of the turbine torque Tt, the low-gear position clutch torque Tclow and the high-gear position clutch torque Tchi are derived from the above-indicated equations (1) and (2) and the equation representing the relationship between Tclow and Tchi. The turbine torque Tt (equivalent to the engine torque Te) is represented by the relationship equation including x (=xlow), (1−x) (=xhi), input shaft angular acceleration dωt/dt, and transmission output torque To. Similarly, the low-gear position clutch torque Tclow is represented by the relationship equation including x (=xlow), input shaft angular acceleration dωt/dt, and transmission output torque To. Similarly, the high-gear position clutch torque Tchi is represented by the relationship equation including (1−x) (=xhi), input shaft angular acceleration dωt/dt, and transmission output torque To. Namely, according to the shifting model used in the present embodiment, the above-described manipulated amounts are calculated on the basis of the above-described shifting target values and according to the motion equations (above-indicated equations (1) and (2)) of the automatic transmission 18 including the shifting target values and the manipulated amounts, and the relationships (above-indicated equations (3) and (4)) representing the above-described torque assignment ratios. Thus, the present embodiment is configured to implement the shifting control of the automatic transmission 18 according to the shifting model, by setting the restricting condition in the form of the torque assignment ratio x, in addition to the above-indicated equations (1) and (2). Therefore, the three manipulated amounts can be adequately determined according to the above-indicated shifting model, even if there are three manipulated amounts for the two shifting target values.

Described more specifically by reference to FIG. 2, the shifting control portion 74 determines whether the automatic transmission 18 is in a shifting action, depending upon whether the shifting action determined to take place is terminated or not.

If the shifting control portion 74 determines that the automatic transmission 18 is in a shifting action, the manipulated amount calculating means in the form of a manipulated amount calculating portion 76 calculates the above-described manipulated amounts on the basis of the above-described shifting target values and according to the above-described shifting model. Described more specifically, the manipulated amount calculating portion 76 is provided with the torque assignment ratio calculating means in the form of a torque assignment ratio calculating portion 78 and the shifting target value calculating means in the form of a shifting target value calculating portion 80.

The torque assignment, ratio calculating portion 78 is configured to calculate the torque assignment ratio x on the basis of a length of time lapse from a moment of initiation of the shifting control (or a moment of calculation of the ratio x in the last control cycle) and according to a predetermined relationship (shifting progress map) representing the manner of change of the torque assignment ratio x, for example. Then, the torque assignment ratio calculating portion 78 calculates the torque assignment ratio xlow of the low-gear position coupling device and the torque assignment ratio xhi of the high-gear position coupling device on the basis of the calculated torque assignment ratio x and according to the above-indicated equations (3) and (4). It is noted that the above-indicated shifting progress map is determined for each of the specific shifting actions and for each of the combinations of the two shift positions between which the relevant shifting action takes place, and that an initial value of the torque assignment ratio x is set to be 1 for each shift-up action, and to be 0 for each shift-down action.

The shifting target value calculating portion 80 is configured to calculate the target value of the input shaft angular acceleration dωt/dt in the inertia phase on the basis of the length of time lapse from a moment of initiation of the inertia phase (or a moment of calculation of the angular acceleration dωt/dt in the last control cycle) and according to a predetermined relationship (input shaft angular acceleration change map) representing the manner of change of the input shaft angular acceleration dωt/dt such that the turbine speed ωt (=transmission input speed ωi) in the inertia phase changes so as to provide a best compromise between reduction of the shifting shock and the required shifting time, for instance. The shifting target value calculating portion 80 is further configured to calculate the target value of the input shaft angular acceleration dωt/dt in the phase other than the inertia phase, on the basis of a change of the turbine speed ωt (=transmission input speed ωi), for instance. The shifting target value calculating portion 80 is also configured to calculate the target value of the transmission output torque To on the basis of the required drive force Fdem calculated by the engine output control portion 72 and the length of time lapse from the moment of initiation of the shifting control (or a moment of calculation of the required drive force Fdem in the last control cycle) and according to a predetermined relationship (transmission output torque change map) representing the manner of change of the transmission output torque To, for instance. It is noted that the above-indicated input shaft angular acceleration change map and transmission output torque change map are determined for each of the specific shifting actions and for each of the combinations of the two shift positions between which the relevant shifting action takes place.

The manipulated amount calculating portion 76 calculates, as the above-described manipulated amounts, each of required values of the turbine torque Tt (equivalent to the engine torque Te), the low-gear position clutch torque Tclow and the high-gear position clutch torque Tchi, on the basis of the torque assignment ratios (x, xlow, xhi) of the coupling devices calculated by the torque assignment ratio calculating portion 78, and the shifting target values (dωt/dt and To) calculated by the shifting target value calculating portion 80, and according to the relationship equations for calculating the manipulated amounts.

If the shifting control portion 74 determines that the automatic transmission 18 is in a shifting action, the engine output control portion 72 generates the engine output control command signals Se so as to obtain the required value of the turbine torque Tt (equivalent to the engine torque Te) calculated by the manipulated amount calculating portion 76. If the shifting control portion 74 determines that a shifting action of the automatic transmission 18 should take place, the shifting control portion 74 applies to the hydraulic control unit 28, the hydraulic command signals Sp for obtaining the required values of the low-gear position clutch torque Tclow and the high-gear position clutch torque Tchi calculated by the manipulated amount calculating portion 76, such that the determined gear position is achieved.

Figure 3:
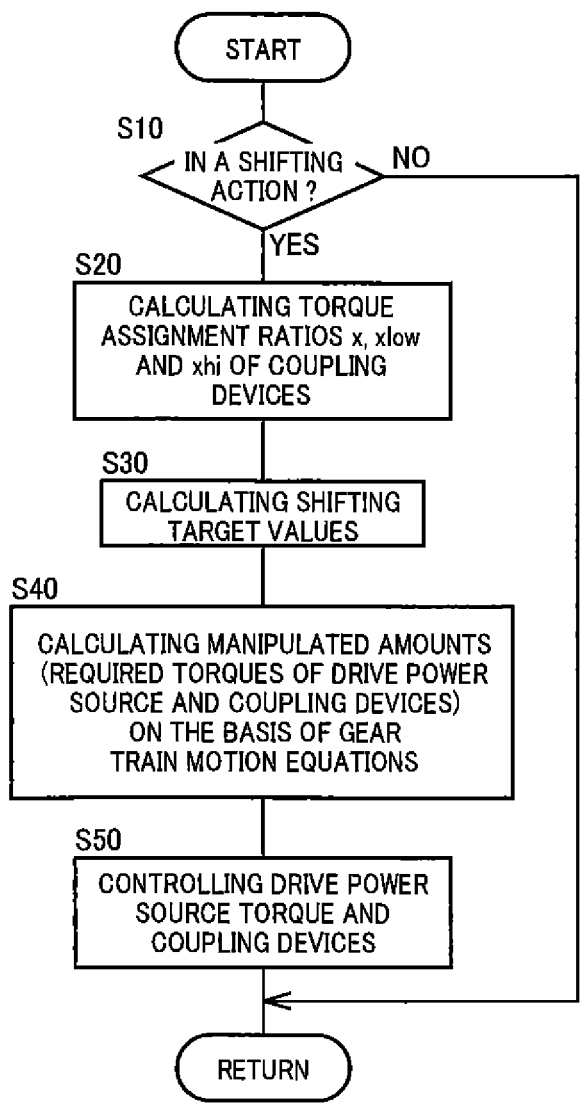
FIG. 3 is a flow chart for explaining a major control operation of the electronic control device, namely, a control operation to perform a desired shifting action of an automatic transmission according to a shifting model, even where three manipulated amounts are used for two shifting target values.
Figure 4:
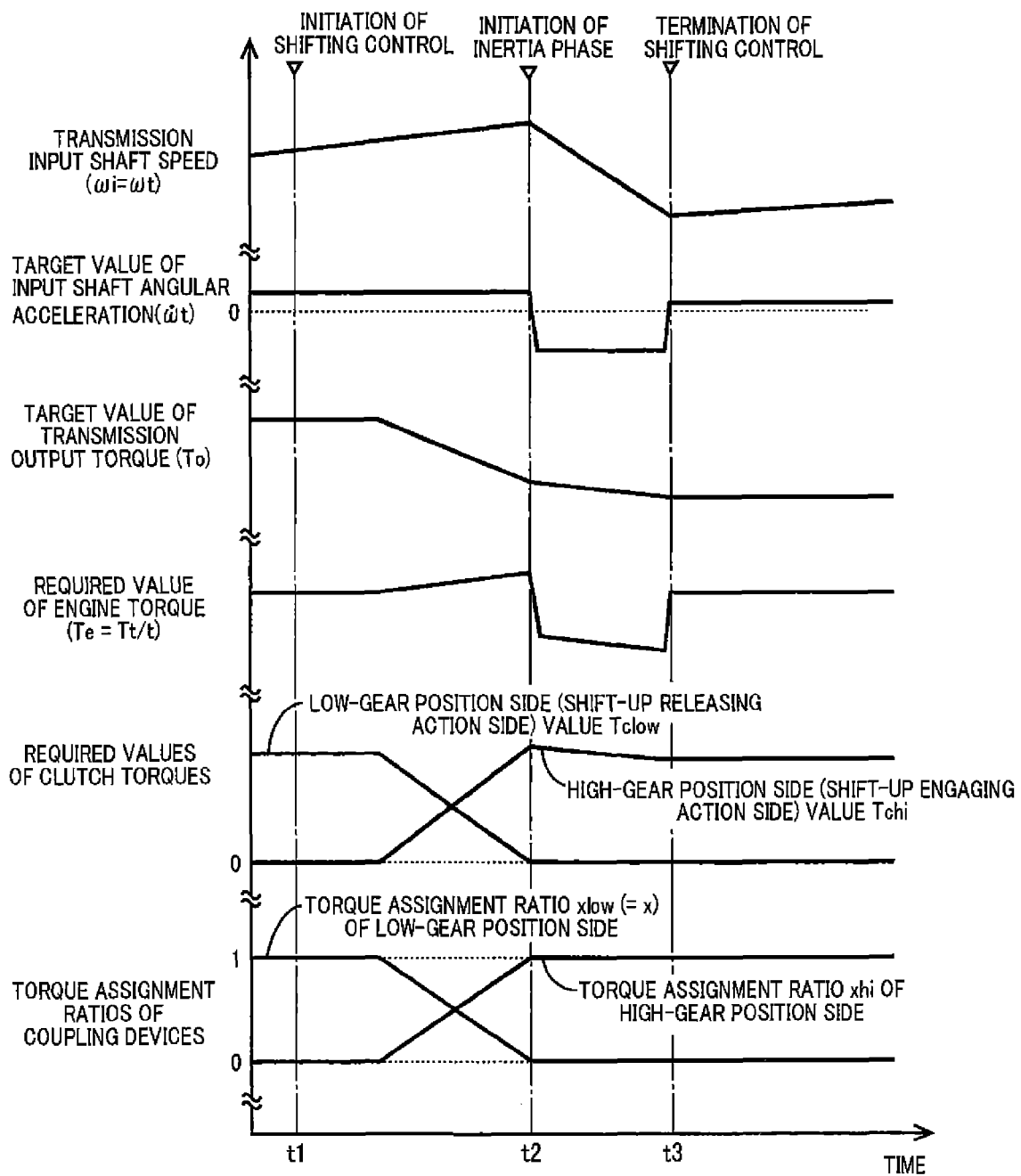
FIG. 4 is a time chart illustrating an example of the control operation shown in the flow chart of FIG. 3, when a power-on shift-up action of the automatic transmission is performed.

FIG. 3 is the flow chart for explaining a major control operation of the electronic control device 70, namely, a control operation to perform a desired shifting action of the automatic transmission 18 according to the shifting model, even where the three manipulated amounts are used for the two shifting target values. The control operation is repeatedly implemented with an extremely short cycle time of about several milliseconds to about several tens of milliseconds, for example. FIG. 4 is the time chart illustrating an example of the control operation shown in the flow chart of FIG. 3, when a power-on shift-up action of the automatic transmission is performed.

The control operation of FIG. 3 is initiated with step S10 ("step" being hereinafter omitted) corresponding to the shifting control portion 74, to determine whether the automatic transmission 18 is in a shifting action. If a negative determination is obtained in S10, the present routine is terminated. If an affirmative determination is obtained in S10 (during a time period from a point of time t1 to a point of time t3 in FIG. 4), the control flow goes to S20 corresponding to the torque assignment ratio calculating portion 78, to calculate the torque assignment ratios (x, xlow and xhi) of the relevant coupling devices. Then, the control flow goes to S30 corresponding to the shifting target value calculating portion 80, to calculate the shifting target values (target values of input shaft angular acceleration dωt/dt and transmission output torque To). The control flow then goes to S40 corresponding to the manipulated amount calculating portion 76, to calculate the manipulated amounts (required values of engine torque Te, low-gear position clutch torque Tclow and high-gear position clutch torque Tchi) on the basis of the torque assignment ratios calculated in the above-described S20 and the shifting target values calculated in the above-described S30, and according to the relationship equations formulated to calculate the manipulated amounts. Then, the control flow goes to S50 corresponding to the engine output control portion 72 and the shifting control portion 74, to generate the engine output control command signals Se and the hydraulic command signals Sp, for controlling the engine 12, the coupling device to be released, and the coupling device to be engaged, such that the manipulated amounts calculated in the above-described S40 are obtained.

Although the transmission output torque To may abruptly change due to an inertia torque in the inertia phase, the target value of the transmission output torque To in the inertia phase is set according to the present embodiment, as indicated in FIG. 4, as if the inertia torque was absent, in order to reduce the shifting shock. The required value of the engine torque Te is determined so as to establish the thus set target value of the transmission output torque To, so that the engine torque reduction control to offset the inertia torque is implemented. Thus, the present embodiment is configured to incorporate the torque of the engine 12 into the motion equations, as a control parameter, without disturbing the shifting model control as a whole.

As described above, the present embodiment is configured to use the torque assignment ratios x as the restricting condition, in view of the finding that the above-indicated equations (1) and (2) cannot be solved unless a certain restricting condition is set. Accordingly, the torque transfer between the two coupling devices during a shifting action, which would otherwise be considered difficult to control, can be adequately controlled by solving the equations. Described in a different way, the torque assignment ratios x representative of the torque transfer are set as the restricting condition, so that only one shifting model can deal with all of different shifting actions. Described more specifically, the torque assignment ratios x suitable for controlling a progress of the shifting action are used as the restricting condition, so that it is possible to reduce a risk of easy occurrence of a tie-up or racing phenomenon, or to improve ease of control to be implemented for positively causing the tie-up or racing phenomenon to the contrary. Further, the engine torque reduction control can be adequately implemented. Thus, the present embodiment permits adequate determination of the three manipulated amounts according to the shifting model, and a desired shifting control of the automatic transmission 18 so as to establish the two shifting target values, although the three manipulated amounts are used for the two shifting target values.

The present embodiment is further configured to calculate the manipulated amounts on the basis of the shifting target values, by using the motion equations in the form of the above-indicated equations (1) and (2), and the relationships in the form of the above-indicated equations (3) and (4), so that the three manipulated amounts can be adequately determined according to the above-indicated motion equations formulated to implement the control of the torque transfer between the two coupling devices during a shifting action, which would otherwise be considered difficult.

Other embodiments of this invention will be described. In the following description, the same reference signs will be used to identify the corresponding elements in the different embodiments, which will not be described redundantly.
Second Embodiment In the first embodiment described above, the target value of the transmission output torque To in the inertia phase is set as indicated in the time chart of FIG. 4, on the condition that the inertia torque can be entirely offset by the engine torque reduction control. Under some condition depending upon the specific shifting action, the specific two shift positions between which the shifting action takes place, the specific vehicle running speed V during the shifting action, the specific operating state of the engine 12, etc., however, there may be a case where only a part of the inertia torque can be offset. Under such condition, the shifting target value calculating portion 80 according to the present embodiment sets the target value of the transmission output torque To in the inertia phase, on the condition that only a part of the inertia torque can be offset by the engine torque reduction control. That is, the rest of the inertia torque which cannot be offset is added to the target value of the transmission output torque To in the inertia phase, so that the target value changes by a large amount at a moment of initiation of the inertia phase or at a moment of termination of the inertia phase. If the required value of the torque of one of the two coupling devices (releasing action side clutch torque) is zero as a result of completion of the torque transfer between the coupling devices, as indicated in FIG. 4, there is a risk of increase of the shifting shock due to abrupt changes of the actual values of the transmission output torque To and the input shaft angular acceleration dωt/dt with respect to the target values, and a racing phenomenon of the turbine speed ωt, which abrupt changes and racing phenomenon are caused by delayed changes or variations of the actual values of the manipulated amounts (clutch torques and engine torque) with respect to the required values.

In view of the above, the present embodiment is configured to cause a tie-up phenomenon during the torque transfer between the two coupling devices, for reducing the above-indicated abrupt changes and racing phenomenon. For example, the present embodiment is configured to increase at least one of the low-gear position clutch torque Tclow and the high-gear position clutch torque Tchi, for receiving an amount of change of the transmission output torque To and thereby reducing the amount of change of the transmission output torque To. One example of the manner of causing the tie-up phenomenon will be described. In the first embodiment described above, the sum of the torque assignment ratio xlow of the low-gear position coupling device and the torque assignment ratio xhi of the high-gear position coupling device is set to be 1 (=xlow+xhi), so that there arise no tie-up and racing phenomena. In the present second embodiment, on the other hand, at least one of the torque assignment ratio xlow and the torque assignment ratio xhi is increased by a tie-up amount α (tie-up ratio α), as indicated by the following equations (5) and (6)

$$xlow = x + \alpha \quad (5)$$

$$xhi = (1-x) + \alpha \quad (6)$$

Described more specifically, the manipulated amount calculating portion 76 uses the target values of the input shaft angular acceleration dωt/dt and the transmission output torque To as calculated by the shifting target value calculating portion, in the above-indicated relationship equations for calculation of the manipulated amounts. For calculating the turbine torque Tt, the manipulated amount calculating portion 76 uses the torque assignment ratio x of the coupling devices as calculated by the torque assignment ratio calculating portion 78 in the above-indicated relationship equations. For calculating the torque of at least one of the two coupling devices the torque of which is increased to cause the tie-up phenomenon, that is, at least one of the low-gear position clutch torque Tclow and the high-gear position clutch torque Tchi, which is increased to cause the tie-up phenomenon, the manipulated amount calculating portion 76 uses the torque assignment ratio xlow or xhi including the added tie-up amount α (calculated according to the above-indicated equation (5) or (6)), in the relevant relationship equation. When the tie-up phenomenon is caused, it is desirable that the increase of the relevant clutch torque does not influence the actual transmission output torque To in the phase other than the inertia phase. Namely, it is desirable that the increase of the relevant clutch torque does not increase the transmission output torque To. The transmission output torque To will not be increased by the increase of the relevant clutch torque, as long as the two members disposed on the respective opposite side of the relevant coupling device do not have a difference in their rotating speeds. This means that the above-indicated relevant coupling device has no speed difference between the above-indicated two members, upon initiation of the torque transfer.

The present embodiment is configured to overcome a problem of a risk of increase of the shifting shock due to a delayed change or variation of the actual value of the transmission output torque To with respect to the manipulated amounts controlled so as to follow the target value of the transmission output torque To, where the target value of the transmission output torque To is determined under the condition that only a part of the inertia torque can be offset by the engine torque reduction control. It is considered that this problem becomes serious where the amount of reduction of the engine torque by the engine torque reduction control is relatively small, or where a response of the actual engine torque reduction to the engine torque reduction control is relatively low. In view of this consideration, the manipulated amount calculating portion 76 according to the present embodiment increases the tie-up amount α used for calculation of the torque of the relevant coupling device, with a decrease of the amount of the engine torque reduction by the engine torque reduction control in the inertia phase during the relevant shifting action of the automatic transmission 18, or with a decrease of the response of the actual engine torque reduction to the engine torque reduction control.

Figure 5:
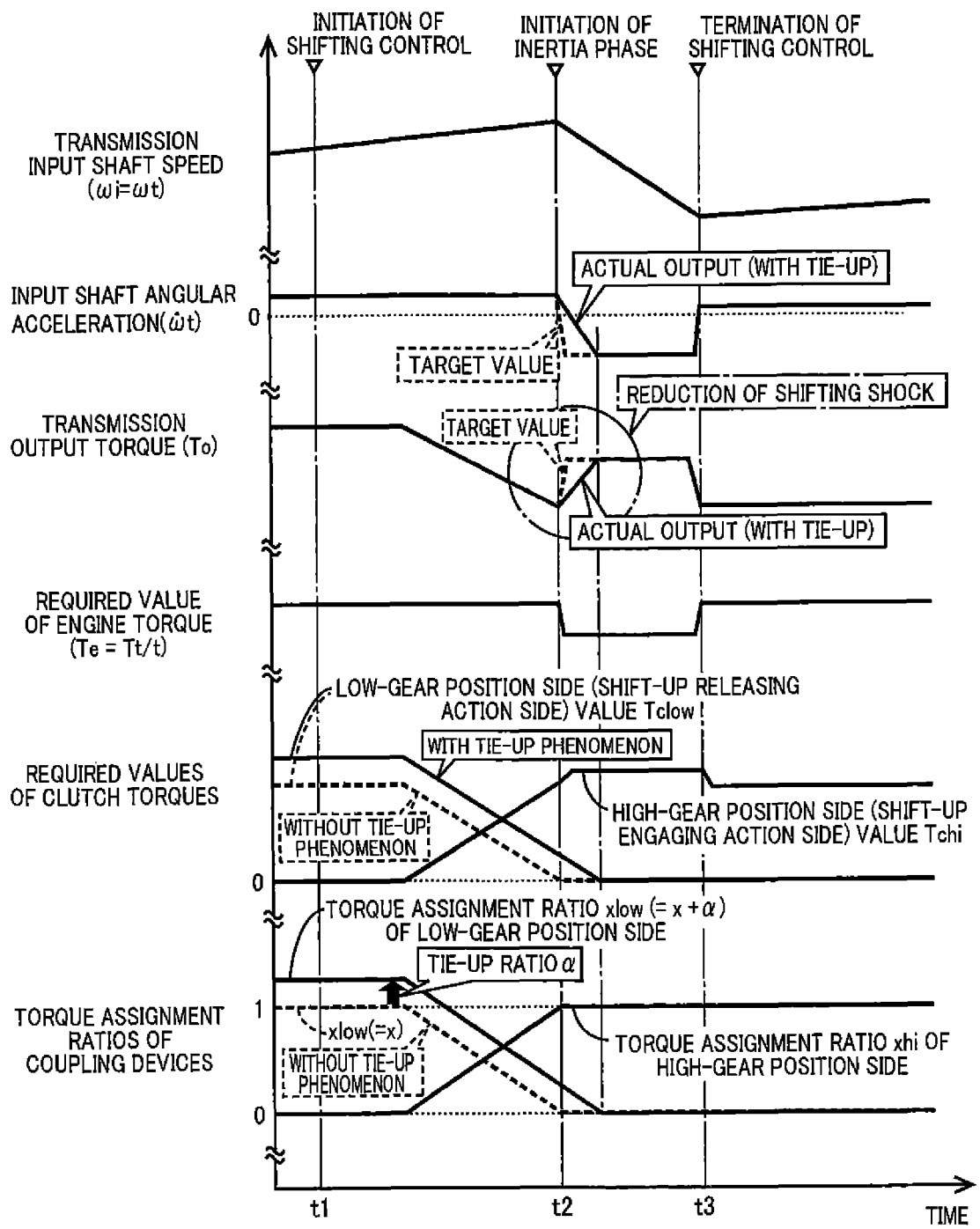
FIG. 5 is a time chart illustrating an example of the control operation shown in the flow chart of FIG. 3, which is performed for a power-on shift-up action of the automatic transmission involving a tie-up phenomenon.

In the present embodiment, too, the control operation is performed basically according to the flow chart of FIG. 3. The present embodiment uses the torque assignment ratios including the added tie-up amount α to calculate the clutch torques of the relevant coupling devices. FIG. 5 is the time chart illustrating an example of the control operation shown in the flow chart of FIG. 3, which is performed for a power-on shift-up action of the automatic transmission involving a tie-up phenomenon.

Referring to FIG. 5, broken lines represent an example of the shifting target values and the manipulated amounts to establish the shifting target values when the tie-up phenomenon does not take place, while solid lines represent an example of the shifting target values and the manipulated amounts when the tie-up phenomenon takes place without changing the shifting target values. In the inertia phase, the target value of the transmission output torque To is increased by the part of the inertia torque which cannot be offset by the engine torque reduction control, so that the target value of the transmission output torque To abruptly changes upon initiation of the inertia phase. In view of this fact, the torque assignment ratio including the added tie-up amount α is used as the torque assignment ratio xlow of the relevant coupling device to be released, so that the tie-up phenomenon takes place. As a result, the actual values of the transmission output torque To and the input shaft angular acceleration dωt/dt upon initiation of the inertia phase are reduced with respect to the target values.

As is understood from the foregoing description, the present embodiment has substantially the same advantages as the first embodiment described above. In addition, the present embodiment is configured to use the torque assignment ratios including the added tie-up amount α, for determining the torque capacities of the relevant coupling devices, so that the torque transfer between the coupling devices is controlled so as to cause the tie-up phenomenon, whereby the torque transfer can be smoothly implemented, with the relevant coupling devices absorbing an abrupt change of the transmission output torque, making it possible to reduce the shifting shock which would have a risk of increase upon a considerable change of the shifting target values.

The present embodiment is further configured such that each of the relevant coupling devices has no difference in the rotating speeds of the two rotary members, so that the clutch torque increased to cause the tie-up phenomenon does not increase the transmission torque, that is, does not have an influence on the actual value of the transmission output torque To, in the phase other than the inertia phase.

The present embodiment is also configured to increase the tie-up amount α with a decrease of the amount of the torque reduction by the engine 12 in the inertia phase, or with a decrease of the response of the engine torque reduction, so that the torque transfer between the relevant coupling devices is controlled so as to increase the degree of causing the tie-up phenomenon with an increase of the amounts of change of the shifting target values, or with an increase of the degree of likelihood of abrupt change of the actual values of the shifting target values, making it possible to more effectively reduce the shifting shock.

Third Embodiment

The second embodiment described above is configured to set the manipulated amounts so as to intentionally prevent the manipulated amounts from following the shifting target values, for reducing the shifting shock, in order to solve the problem of a risk of increase of the shifting shock due to a delayed change or variation of the actual values of the manipulated amounts controlled so as to follow the target value of the transmission output torque To. Namely, the second embodiment is not configured to set the shifting target values so as to reduce the shifting shock, for controlling the manipulated amounts so as to follow the thus set shifting target values. However, it is basically desirable to set the shifting target values so as to reduce the shifting shock, for controlling the manipulated amounts so as to follow the thus set shifting target values.

In the preceding second embodiment wherein the torque assignment ratios include the added tie-up amount α, the torque assignment ratio xlow plus the torque assignment ratio xhi is not 1 (xlow+xhi≠1), therefore, the shifting model for calculating the manipulated amounts cannot be established, in the strict sense. In the phase other than the inertia phase (prior to the moment of initiation of the inertia phase indicated in FIG. 5, for instance), the tie-up amount α does not result in an increase of the transmission torque, so that the shifting target values can be eventually established, even though the shifting model cannot be established. In the inertia phase, however, the tie-up amount α results in an increase of the transmission torque, so that the shifting target values cannot be established.

It is noted that the relevant coupling devices for which the tie-up amount α is used have no speed difference between the respective two rotary members if the torque transfer between the coupling devices is performed in the phase other than the inertia phase, but have a speed difference in a direction if the torque transfer between the coupling devices is performed in the inertia phase and the torque is generated. The present inventors found that the direction of the torque actually generated by the relevant coupling device in the inertia phase is not coincident with the sign of the torque assignment ratio of the coupling device.

In view of the finding described above, the present embodiment is configured such that the manipulated amount calculating portion 76 calculates the torque of one of the two coupling devices in the inertia phase, by reversing the sign of the torque assignment ratio (one of xlow and xhi) of the relevant coupling device, which includes the added tie-up amount α used to determine the torque capacity of the relevant coupling device. Further, the manipulated amount calculating portion 76 changes the torque assignment ratio (the other of xlow and xhi) of the other coupling device in the inertia phase, such that the equation xlow+xhi=1 is satisfied, and calculates the torque of this other coupling device on the basis of the thus changed torque assignment ratio.

Figure 6:
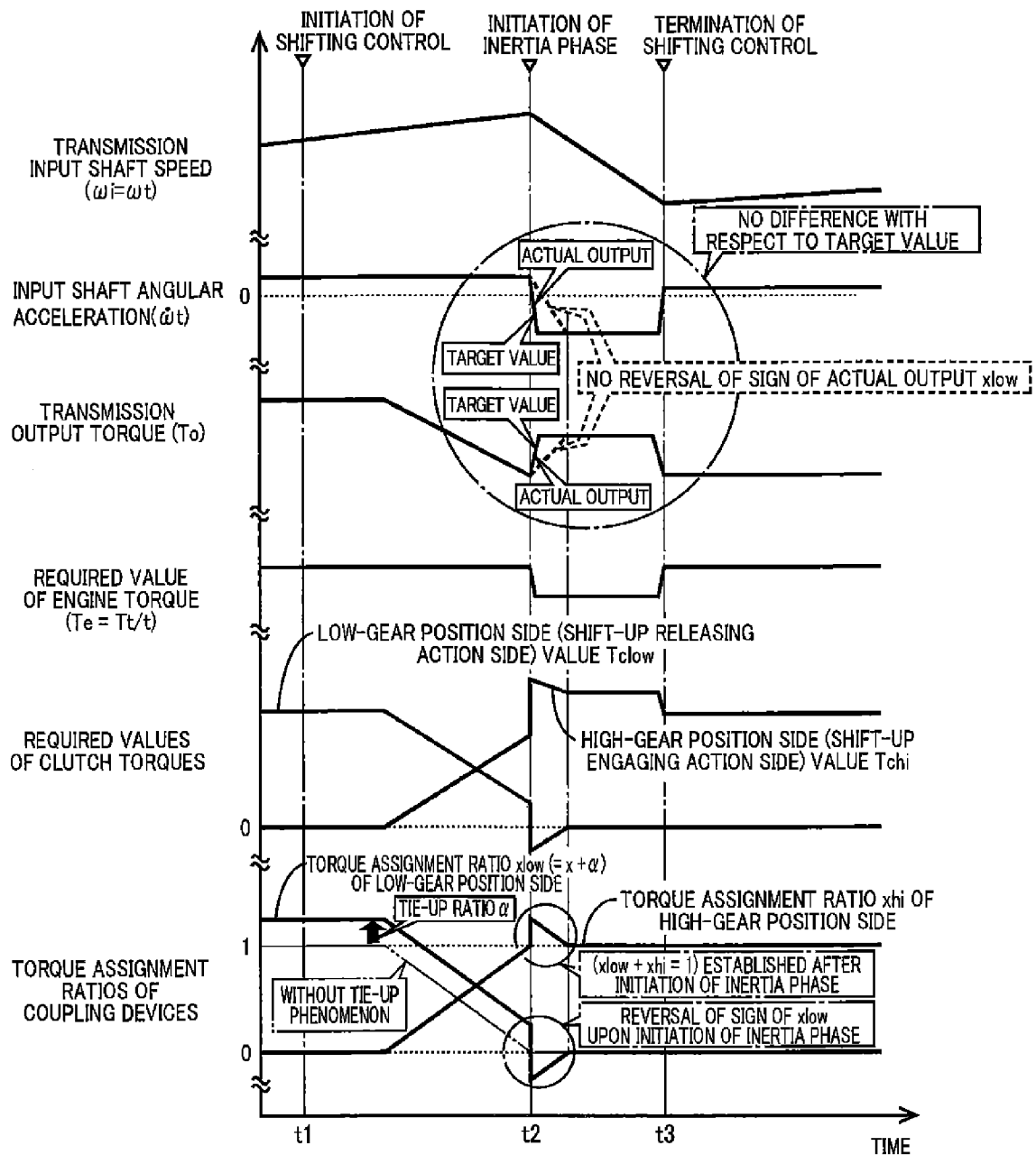
FIG. 6 is a time chart illustrating an example of the control operation shown in the flow chart of FIG. 3, which is performed for a power-on shift-up action of the automatic transmission involving a tie-up phenomenon and wherein a sign of a torque assignment ratio of a relevant coupling device in an inertia phase is reversed.

In the present embodiment, too, the control operation is performed basically according to the flow chart of FIG. 3. The present embodiment uses the torque assignment ratio including the added tie-up amount α to calculate the clutch torque of the relevant coupling device, and reverses the sign of the torque assignment ratio of the relevant coupling device in the inertia phase. FIG. 6 is the time chart illustrating an example of the control operation shown in the flow chart of FIG. 3, which is performed for =a power-on shift-up action of the automatic transmission involving a tie-up phenomenon and wherein the sign of the torque assignment ratio of the relevant coupling device in the inertia phase is reversed.

Referring to FIG. 6, broken lines represent an example of the actual values of the shifting target values where the sign of the torque assignment ratio xlow is not reversed during the inertia phase, and correspond to the solid lines in FIG. 5, for example, while solid lines represent an example of the shifting target values actually established according to the present embodiment. Upon initiation of the inertia phase, the sign of the torque assignment ratio xlow of the relevant coupling device to be released is reversed, and the torque assignment ratio xhi of the coupling device to be engaged is changed so as to satisfy the equation xlow+xhi=1. As a result, the shifting target values are actually established after initiation of the inertia phase such that the actual values of the shifting target values follow the target values. Thus, the shifting control is implemented to control the manipulated amounts so as to establish the shifting target values which are set so as to reduce the shifting shock.

As is understood from the foregoing description, the present embodiment has substantially the same advantages as the second embodiment described above. In addition, the present embodiment is configured to reverse the sign of the torque assignment ratio of the relevant coupling device in the inertia phase, such that the sign is coincident with the direction of the torque actually generated by the relevant coupling device, so that the manipulated amounts can be determined so as to permit the shifting target values to be established in the inertia phase, while permitting a smooth torque transfer between the two coupling devices, whereby the shifting action can be performed in a desired manner.

Fourth Embodiment

The second and third embodiments described above are configured to use the torque assignment ratios including the added tie-up amount α, for ensuring a smooth torque transfer between the relevant coupling devices. By the way, the vehicle 10 according to the illustrated embodiments is switchable between a known automatic shifting mode in which the automatic transmission18 is shifted according to a shifting map, and a known manual shifting mode in which the automatic transmission 18 is manually shifted by the vehicle operator. In the manual shifting mode, the vehicle operator may want a feeling of a shifting action of the automatic transmission 18 involving a shifting shock. However, the use of the torque assignment ratios including the same tie-up amount α as used in the automatic shifting mode may prevent such a shifting action involving a shifting shock. In view of this, the present embodiment reduces the added tie-up amount α in the manual shifting mode, as compared with that used in the automatic shifting mode.

Figure 7:
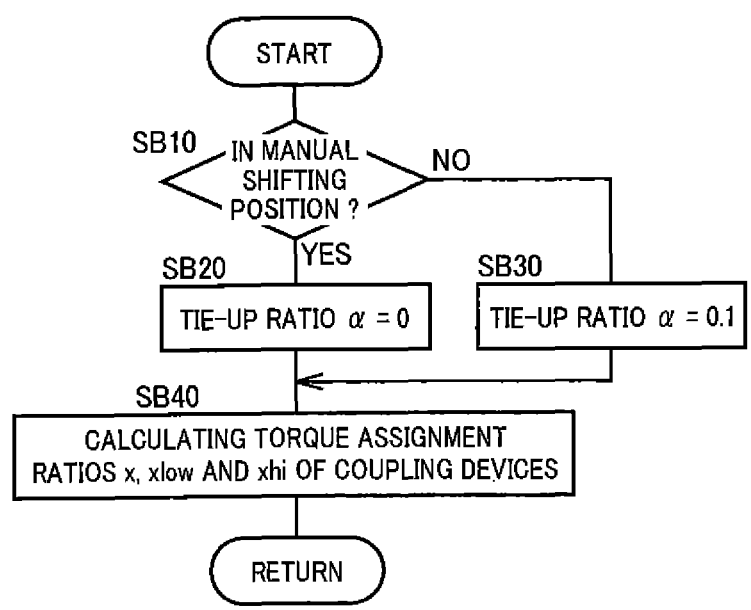
FIG. 7 is a flow chart for explaining a major control operation of the electronic control device, namely, a control operation to adequately shift the automatic transmission with torque assignment ratios suitable for a selected shifting mode of the automatic transmission.

FIG. 7 is the flow chart for explaining a major control operation of the electronic control device 70, namely, a control operation to adequately shift the automatic transmission 18 with torque assignment ratios suitable for a selected one of the shifting modes of the automatic transmission 18. The control operation is repeatedly implemented with an extremely short cycle time of about several milliseconds to about several tens of milliseconds, for example.

The control operation of FIG. 7 is initiated with SB10 corresponding to the shifting control portion 74, to determine whether the vehicle is placed in a manual shifting mode (a manual shifting position). This determination is made on the basis of the shift position SH detected by the shift position sensor 60. If an affirmative determination is obtained in SB10, the control flow goes to SB20 corresponding to the manipulated amount calculating portion 76, to set the tie-up amount α to be 0, for example. If a negative determination is obtained in SB10, the control flow goes to SB30 corresponding to the manipulated amount calculating portion 76, to set the tie-up amount α to be 0.1, for example. SB20 and SB30 are followed by SB40 corresponding to the manipulated amount calculating portion 76 (equivalent to torque assignment ratio calculating portion 78), to calculate the torque assignment ratios of the coupling devices (x, xlow and xhi) (according to the above-indicated equations (5) and (6)). It is noted that the tie-up amount α to be set in SB20 is not limited to 0, as far as this tie-up amount α is smaller than that to be set in SB30.

As described above, the present embodiment has substantially the same advantages as the second and third embodiments described above. In addition, the present embodiment is configured to permit a shifting action with intentional generation of a shifting shock.

Fifth Embodiment

In the first through fourth embodiments described above, the coupling devices of the automatic transmission 18 are hydraulically operated frictional coupling devices. The automatic transmission 18 in the illustrated embodiment is provided with a known one-way clutch disposed in parallel with at least one brake. Unlike the hydraulically operated frictional coupling devices, this one-way clutch cannot be controlled of its torque. In the inertia phase of a shifting action involving an engaging or releasing action of the one-way clutch, this one-way clutch cannot have a torque capacity, so that the shifting target values cannot be established. In view of this, the present embodiment is configured to set the torque assignment ratio (one of xlow and xhi) of the one-way clutch to be 0, and to set the torque assignment ratio (the other of xlow and xhi) of the other relevant coupling device to be 1 during an inertia phase of a shifting action involving an engaging or releasing action of the one-way clutch.

FIG. 8 is the flow chart for explaining a major control operation of the electronic control device 70, namely, a control operation to adequately shift the automatic transmission involving the engaging or releasing action of the one-way clutch. The control operation is repeatedly implemented with an extremely short cycle time of about several milliseconds to about several tens of milliseconds, for example.

The control operation of FIG. 8 is initiated with SC10 corresponding to the shifting control portion 74, to determine whether the coupling devices to be engaged and released for a shifting action include the one-way clutch. This determination is made on the basis of the two gear positions between which the shifting action takes place. If an affirmative determination is obtained in SC10, the control flow goes to SC20 corresponding to the shifting control portion 74, to determine whether the present shifting action is in the inertia phase. If a negative determination is obtained in SC10 or SC20, the present routine is terminated. If an affirmative determination is obtained in SC20, the control flow goes to SC30 corresponding to the manipulated amount calculating portion 76 (equivalent to torque assignment ratio calculating portion 78), to set the torque assignment ratio (xlow, for example) of the one-way clutch to be 0, and to set the torque assignment ratio (xhi, for example) of the other relevant coupling device to be 1. It is noted that while the control operation of the flow chart of FIG. 8 is performed where the coupling devices provided to perform shifting actions include the one-way clutch, the control operation of the flow chart of FIG. 3 may be performed in place of the control operation of the flow chart of FIG. 8, to calculate the manipulated amounts, with a modification such that a command to establish the calculated manipulated amount of the one-way clutch is not generated.

As is understood from the foregoing description, the present embodiment has substantially the same advantages as the first through fourth embodiments described above. In addition, the present embodiment is configured such that the torque assignment ratios of the coupling devices including the one-way clutch to be engaged or released for a shifting action are determined so as to satisfy the equation xlow+xhi=1 even during the inertia phase, so that the manipulated amounts to establish the shifting target values are uniquely determined so as to permit a desired shifting action.

While the preferred embodiments of this invention have been described in detail by reference to the drawings, it is to be understood that the invention may be otherwise embodied.

Although the illustrated embodiments are independent of each other, the embodiments need not be independent of each other, and may be combined with each other as needed.

In the illustrated embodiments, the output shaft 20 per se is illustrated as the rotary member disposed on the side of the output shaft 20. However, the rotary member on the side of the output shaft 20 is not limited to the output shaft 20 per se, and may be replaced by any other rotary member disposed in the power transmitting path from the output shaft 20 to the drive wheels 26. While the input shaft 16 per se is used as the rotary member disposed on the side of the input shaft 16, the rotary member on the side of the input shaft 16 is not limited to the input shaft 16 per se, and may be replaced by any other rotary member in the power transmitting path from the engine 12 to the input shaft 16.

Although the illustrated second and third embodiments are configured to deal with an abrupt change of the target value of the transmission output torque To at the moment of initiation or termination of the inertia phase under the condition that only a part of the inertia torque can be offset by the engine torque reduction control, the present invention is equally applicable to the setting of the target value of the transmission output torque To which may abruptly change at the moment of initiation or termination of the inertia phase under any other condition.

While the embodiments and modifications have been described for illustrative purpose only, it is to be understood that the invention may be embodied with various other changes and improvements which may occur to those skilled in the art.

NOMENCLATURE OF REFERENCE SIGNS

10: Vehicle
12: Engine (Drive power source)
16: Input shaft
18: Automatic transmission
20: Output shaft
26: Drive wheels
70: Electronic control device (Shift control apparatus)
B1, B2: Brakes (Coupling devices)
C: Clutch (Coupling device)

The invention claimed is:

1. A shift control apparatus for a vehicle including an automatic transmission which comprises a plurality of coupling devices for transmitting a rotary motion and a torque between an input shaft provided to receive a drive force from a drive power source and an output shaft provided to transmit the drive force to drive wheels, and which is configured to be shifted with concurrently performed engaging and releasing actions of the respective coupling devices, said control apparatus being configured to implement a shifting control of said automatic transmission according to a predetermined shifting model for determining manipulated amounts to establish shifting target values, the control apparatus comprising:

a shifting target value calculating portion configured to calculate, as said shifting target values, two values consisting of a torque of an output-side rotary member and a rate of change of a rotating speed of an input-side rotary member, the output-side rotary member being disposed in a power transmitting path from the output shaft to the drive wheels, and the input-side rotary member being disposed in a power transmitting path from the drive power source to the input shaft;

a manipulated amount calculating portion configured to calculate, as said manipulated amounts, three values consisting of a torque of the input-side rotary member, a torque capacity of one of the coupling devices which is to be engaged for a shifting action of said automatic transmission, and a torque capacity of another of the coupling devices which is to be released for the shifting action; and a torque assignment ratio calculating portion configured to calculate torque assignment ratios which are ratios of torques to be transferred through the respective coupling devices to be engaged and released for the shifting action.

2. The shift control apparatus according to claim 1, wherein said manipulated amount calculating portion is operated according to said to shifting model which is formulated to calculate said manipulated amounts on the basis of said shifting target values, and according to motion equations of the automatic transmission, and a relationship representative of said torque assignment ratios, the motion equations including said shifting target values and said manipulated amounts.

3. The shift control apparatus according to claim 1, wherein said torque assignment ratio calculating portion sets each of selected at least one of said torque assignment ratios used for determining the torque capacities of said coupling devices to be respectively engaged and released, such that said each torque assignment ratio includes an added tie-up amount.

4. The shift control apparatus according to claim 3, wherein said each of selected at least one of said coupling which corresponds to said each of selected at least one of said torque assignment ratios does not have a speed difference between two rotary members between which said each coupling device is disposed.

5. The shift control apparatus according to claim 3 wherein said torque assignment ratio calculating portion increases said tie-up amount with a decrease of an amount of torque reduction by the drive power source in an inertia phase of the shifting action of said automatic transmission, or with an increase of a delay in a response of said torque reduction to a control for the torque reduction by said drive power source.

6. The shift control apparatus according to claim 3, wherein the shifting control of said automatic transmission according to said shifting model in an inertia phase of the shifting action is implemented by reversing a sign of the torque assignment ratio which is used to determine the torque capacity of said each of selected at least one of said coupling devices, the torque assignment ratio including said added tie-up amount.

7. The shift control apparatus according to claim 1, wherein the torque assignment ratio calculating portion is configured to calculate the torque assignment ratios such that a sum of the calculated torque assignment ratios is equal to a predetermined value.

8. The shift control apparatus according to claim 1, being configured to implement the shifting control of the automatic transmission according to the predetermined shifting model for determining the manipulated amounts to establish the shifting target values, such that the shifting control according to the predetermined shifting model is implemented at least at a stage prior to an inertia phase of the shifting action of the automatic transmission.

* * * * *